US009726174B2

(12) United States Patent
Tabata et al.

(10) Patent No.: US 9,726,174 B2
(45) Date of Patent: Aug. 8, 2017

(54) ELECTRIC PUMP

(71) Applicants: MIKUNI CORPORATION, Chiyoda-ku, Tokyo (JP); KOKUSAN DENKI CO., LTD., Numazu-shi, Shizuoka (JP)

(72) Inventors: Shingo Tabata, Odawara (JP); Daiki Ihara, Numazu (JP)

(73) Assignees: MIKUNI CORPORATION, Chiyoda-Ku, Tokyo (JP); KOKUSAN DENKI CO., LTD., Numazu-Shi, Shizuoka (JP)

( * ) Notice: Subject to any disclaimer, the term of this patent is extended or adjusted under 35 U.S.C. 154(b) by 191 days.

(21) Appl. No.: 14/417,323

(22) PCT Filed: Jul. 26, 2013

(86) PCT No.: PCT/JP2013/070323
§ 371 (c)(1),
(2) Date: Jan. 26, 2015

(87) PCT Pub. No.: WO2014/017633
PCT Pub. Date: Jan. 30, 2014

(65) Prior Publication Data
US 2015/0275894 A1 Oct. 1, 2015

(30) Foreign Application Priority Data
Jul. 26, 2012 (JP) .................. 2012-166379

(51) Int. Cl.
*F04C 29/00* (2006.01)
*H02K 5/22* (2006.01)
(Continued)

(52) U.S. Cl.
CPC ............ *F04C 15/008* (2013.01); *B60T 13/16* (2013.01); *F04C 18/3446* (2013.01);
(Continued)

(58) Field of Classification Search
CPC .. F04C 29/045; F04C 29/005; F04C 29/0085; F04C 18/344; F04C 11/008;
(Continued)

(56) References Cited

U.S. PATENT DOCUMENTS 5,895,207 A * 4/1999 Burgdorf ................ B60T 8/368
417/410.1
6,550,873 B1 * 4/2003 Hengler .................. B60T 8/368
303/116.4
(Continued)

FOREIGN PATENT DOCUMENTS

CN 101888142 A 11/2010
JP 08200217 a 8/1996
(Continued)

OTHER PUBLICATIONS

Chinese Notification of the First Office Action corresponding to Patent No. 201380049750.1; Issue Date Feb. 15, 2016, with English translation.
(Continued)

*Primary Examiner* — Nathan Zollinger
(74) *Attorney, Agent, or Firm* — Cantor Colburn LLP

(57) ABSTRACT

An electric pump including a motor unit including an end cap attached to a motor cover, and a power supply bus bar having wiring inserted therein is integral with the end cap; a pump unit including a rotor having a vane groove for receiving a vane and connecting to the rotation shaft and also including a pump plate having a cam ring; and a cover covering the pump unit from a side opposite to the motor unit and provided with a connector box surrounding an insertion recessed portion into which the power supply bus bar is inserted. The cam ring has a penetration hole through which the power supply bus bar and wiring can be inserted,
(Continued)

the wiring being electrically connected to a connection unit provided in the insertion recessed portion.

2 Claims, 10 Drawing Sheets

(51) Int. Cl.
*F04C 15/00* (2006.01)
*F04C 18/344* (2006.01)
*B60T 13/16* (2006.01)
*F04C 25/02* (2006.01)

(52) U.S. Cl.
CPC ............ *F04C 29/0085* (2013.01); *H02K 5/22* (2013.01); *F04C 25/02* (2013.01); *F04C 2240/40* (2013.01); *F04C 2240/803* (2013.01)

(58) Field of Classification Search
CPC .............. F04C 2240/30; F04C 2240/40; F04C 2240/803; F04C 18/3446; F04C 25/02; F04C 15/008; F01C 21/0809; F01C 21/0836; F01C 21/10; F01C 21/104; H02K 11/30; H02K 11/33; H02K 5/22; H02K 5/225; F04B 39/121; F04B 35/04; F04B 17/03; B60T 13/16; B60T 8/368; B60T 8/4031; B60T 13/46; B60T 13/52; B60T 17/02

USPC ...... 310/71; 417/410.3, 410.4, 410.2, 410.1; 418/259; 303/12, 116.4, DIG. 10
See application file for complete search history.

(56) References Cited

U.S. PATENT DOCUMENTS

| | | | |
|---|---|---|---|
| 7,652,402 B2* | 1/2010 | Kinoshita | ................ H02K 3/50 310/55 |
| 2010/0074773 A1* | 3/2010 | Watanabe | ............... F01C 21/10 417/410.3 |
| 2010/0290933 A1 | 11/2010 | Tabata et al. | |
| 2011/0175470 A1* | 7/2011 | Kinoshita | ............... F04B 35/04 310/71 |

FOREIGN PATENT DOCUMENTS

| | | |
|---|---|---|
| JP | 2010174851 A | 8/2010 |
| JP | 2010236512 A | 10/2010 |
| JP | 2012012940 A | 1/2012 |

OTHER PUBLICATIONS

International Search Report corresponding to Application No. PCT/JP2013/070323; Date of Mailing: Oct. 29, 2013, with English translation.

* cited by examiner

ELECTRIC PUMP

This is the U.S. national stage of application No. PCT/JP2013/070323, filed on Jul. 26, 2013. Priority under 35 U.S.C. §119(a) and 35 U.S.C. §365(b) is claimed from Japanese Application No. 2012-166379, filed Jul. 26, 2012, the disclosure of which is also incorporated herein by reference.

TECHNICAL FIELD

The present invention relates to, for example, an electric pump for causing a negative pressure chamber of a brake booster of a vehicle to be in a negative pressure.

BACKGROUND ART

A vane-type vacuum pump has been used in a vehicle such as a car and the like in order to, for example, cause a negative pressure chamber of a brake booster to be in a negative pressure. Such vane-type vacuum pumps include an electric pump powered by an electric motor.

Such an electric pump is provided with a conductive part for providing electric power to a rotator of a motor. For example, Patent Literatures 1 and 2 disclose techniques about the conductive part. Patent Literature 1 discloses a technique in which a housing of a pump unit is provided with a wiring hole and a wire harness is inserted through the hole while being connected to a connector at a part positioned on an opposite side of the housing from a motor. Patent Literature 2 discloses a configuration in which an intermediate connector is removably provided to a base plate.

CITATION LIST

Patent Literature

[PTL 1] JP 8-200217 A
[PTL 2] JP 2010-236512 A

SUMMARY OF INVENTION

Technical Problem

Now, removably attaching an intermediate connector to a base plate as in Patent Literature 2 requires a space at the center side for an opening portion through which a rotation shaft is inserted. This limits a space for an electrical configuration including a connector. For example, even if the same motor is used (achieve commonality of motors), some types of electric pumps are provided with only a connector at a base plate, while others also provided with a controller board for driving the motor, and so on. The configuration disclosed in Patent Literature 2 with limited space for an electrical configuration cannot handle such various requirements.

Then, it is conceivable that a connector can be provided at the cover positioned on an opposite side of the housing from the motor as in the configuration of Patent Literature 1. In the configuration of Patent Literature 1, however, a flexibly moving wire harness is inserted into a wiring hole, and the configuration requires pulling the wire harness out of the wiring hole. It is also troublesome to connect the wire harness to the connector.

The present invention has been achieved in view of the above circumstances and aims to provide an electric pump that allows sufficient space for an electric configuration as well as achieving commonality of motor units.

Solution to Problem

To solve the above problems, according to a first aspect of the present invention, provided is an electric pump, including: a motor unit including a rotation shaft, an end cap attached to an opening portion side of a motor cover, and a power supply bus bar integral with the end cap and extending toward a side away from a bottom of the motor cover; a pump unit including a rotor having a vane groove for receiving a vane and connecting to the rotation shaft and a pump plate integrally provided with an external wall portion and a cam ring on which the vane slides; and a cover covering the pump unit from a side opposite to the motor unit and provided with a connector box surrounding an insertion recessed portion into which the power supply bus bar is inserted. In the electric pump, the pump plate has a penetration hole through which the power supply bus bar can be inserted, wiring is inserted into the power supply bus bar and the bus bar and wiring inserted through the penetration hole, the wiring protrudes from a front end of the bus bar, and the wiring is electrically connected to a connection unit provided in the insertion recessed portion.

According to another aspect of the invention, in the above invention, it is preferable that the pump plate be provided with a bulged portion formed by bulging a part of the cam ring toward an external diameter side, and the bulged portion be provided with the penetration hole.

According to another aspect of the invention, in the above invention, it is preferable that an extension unit extending outwardly from an external wall portion of the cover be provided to the external wall portion, a connector cover be drawn from the extension unit toward the motor unit side and an external cable be inserted into an inner space of the connector cover, and a conductive member having one end side electrically connected to the connection unit and the other end side protruding into the inner space of the connector cover be provided in an inside of the extension unit.

According to another aspect of the invention, in the above invention, it is preferable that a controller board electrically connected to the connection unit and controlling action of the rotation shaft in the motor unit be mounted onto the cover.

Advantageous Effects of Invention

An electric pump according to the present invention allows sufficient space for an electric configuration, and also achieves commonality of motor units.

DESCRIPTION OF EMBODIMENTS

Hereinafter, an electric pump according to an embodiment of the present invention will be described with reference to the drawings.

<1. Configuration of Electric Pump 10>

Figure 1:
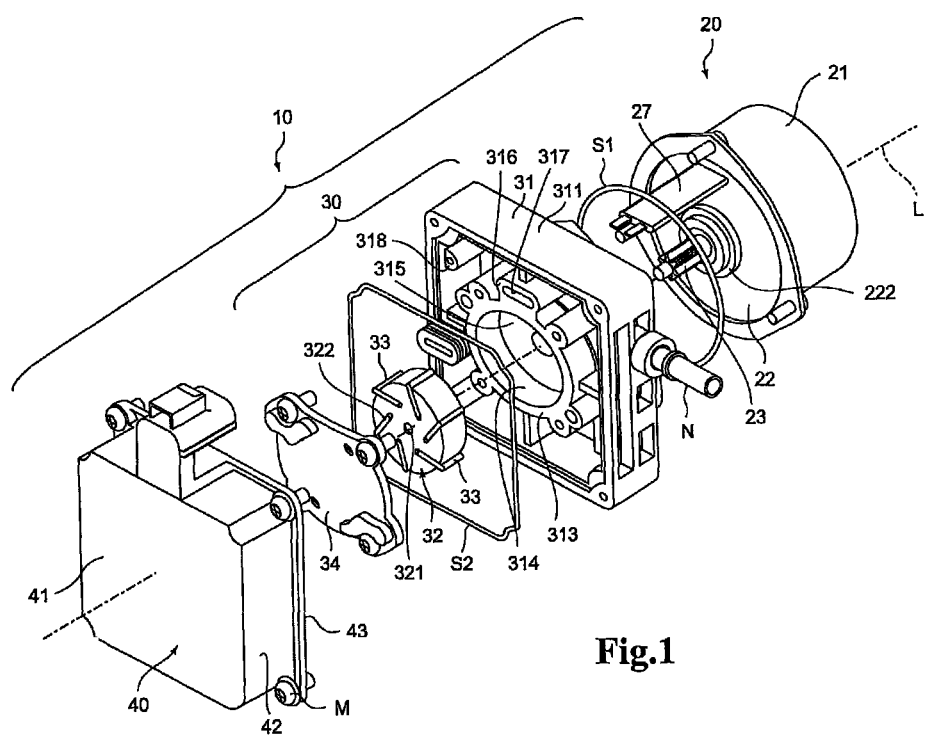
FIG. 1 is an exploded perspective view showing a configuration of an electric pump according to an embodiment of the present invention as seen from a cover side.
Figure 2:
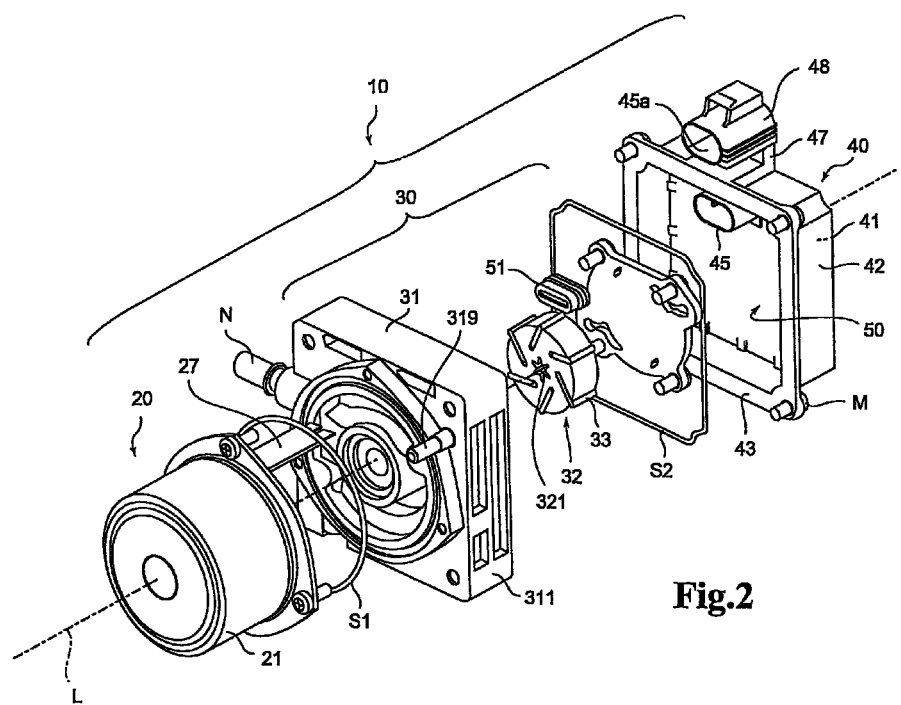
FIG. 2 is an exploded perspective view showing the configuration of the electric pump according to an embodiment of the present invention as seen from a motor unit side.
Figure 3:
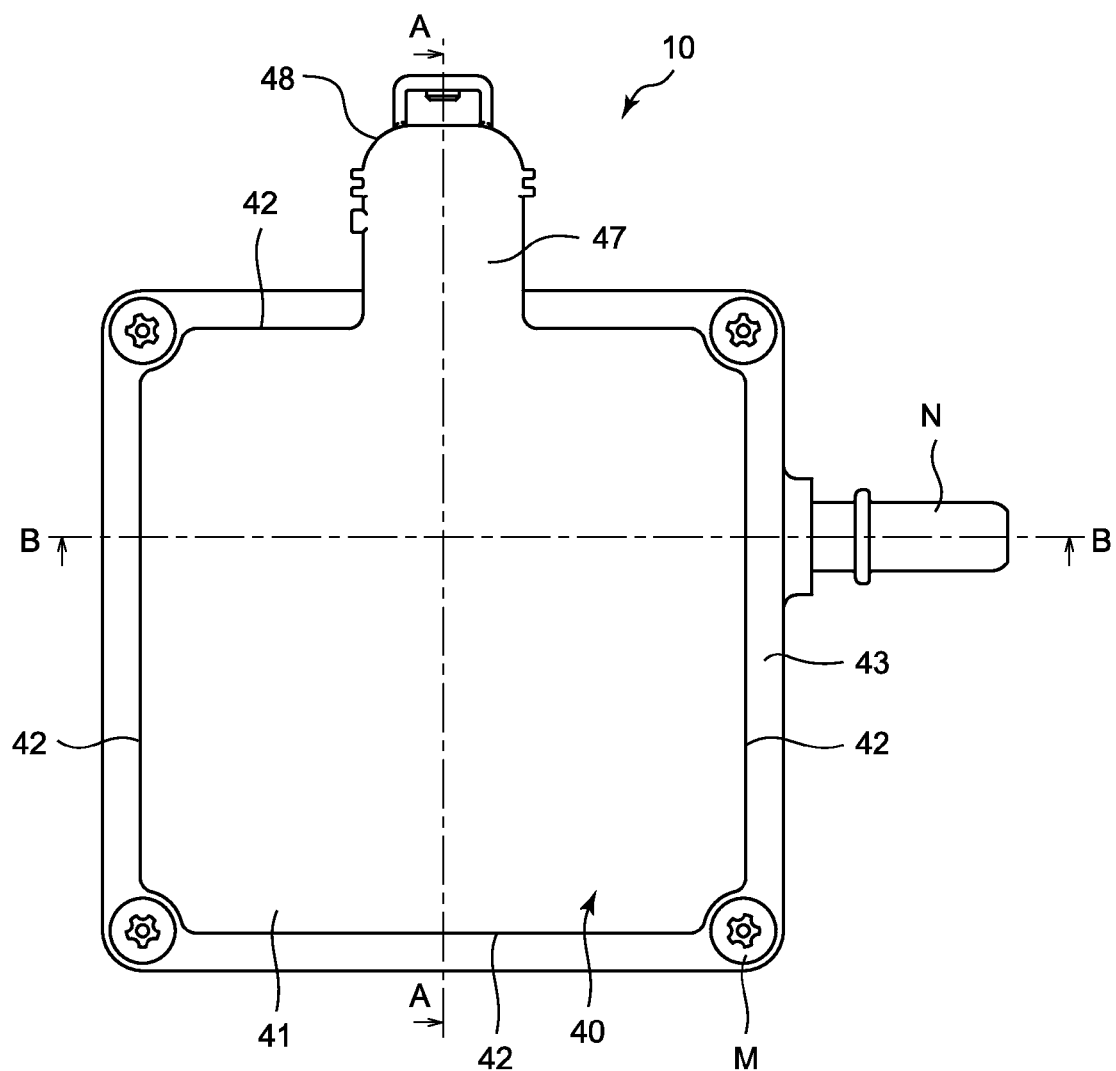
FIG. 3 is a front view of the electric pump of FIG. 1 as seen from the cover side.

FIG. 1 is an exploded perspective view showing a configuration of an electric pump 10 as seen from a pump cover 40 side. FIG. 2 is an exploded perspective view showing the configuration of the electric pump 10 as seen from a motor unit 20 side. FIG. 3 is a front view showing the configuration of the electric pump 10 as seen from the pump cover 40 side. As shown in FIGS. 1 to 3, the electric pump 10 includes the motor unit 20, a vane pump unit 30, and the pump cover 40 as main components.

Figure 4:
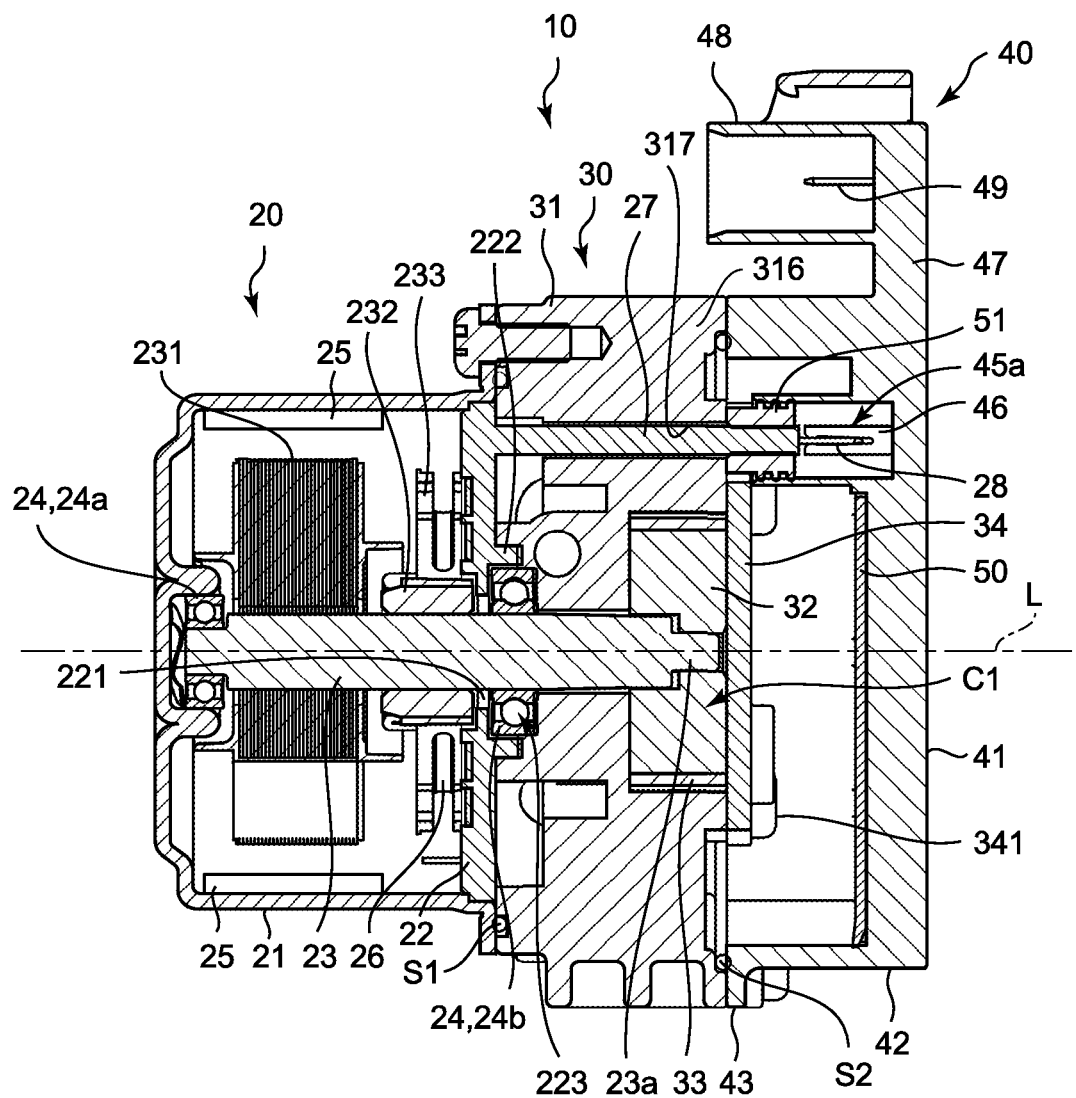
FIG. 4 is a cross sectional view illustrating a configuration of electric pump taken along line A-A of FIG. 3 when it is seen from the side surface side.
Figure 5:
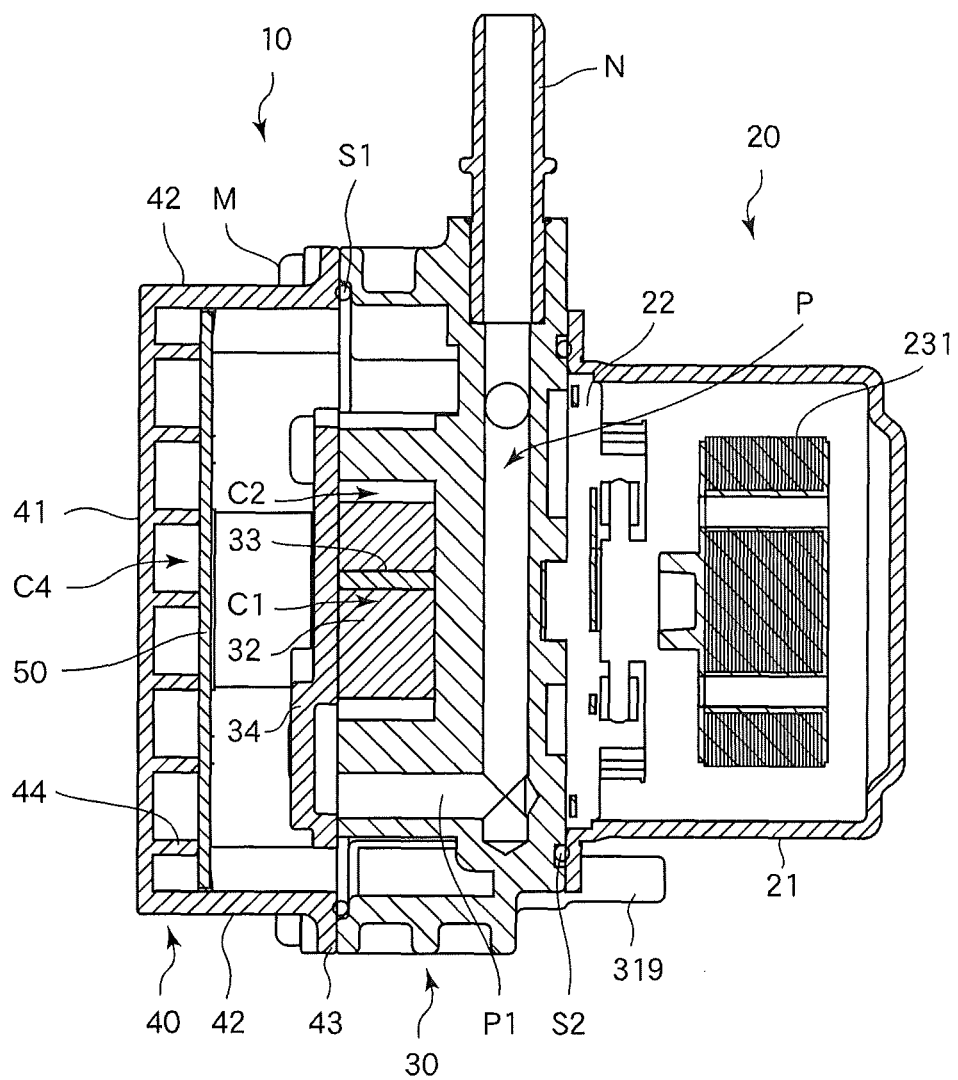
FIG. 5 is a cross sectional view illustrating a configuration of electric pump taken along line B-B of FIG. 3 when it is seen from the side surface side.

FIG. 4 is a cross sectional view illustrating a configuration of the electric pump 10 taken along line A-A of FIG. 3 when it is seen from the side surface side. FIG. 5 is a cross sectional view illustrating a configuration of the electric pump 10 taken along line B-B of FIG. 3 when it is seen from the side surface side. As shown in FIGS. 1, 4, and 5, the motor unit 20 includes an end cap 22, a rotation shaft 23, bearings 24, and magnets 25, which are covered by a motor cover 21. In more detail, the rotation shaft 23 is rotatably supported at one end side by the bearing 24 (24a) attached to a bottom surface side (one end side) of the motor cover 21 and also rotatably supported by the bearing 24 (24b) attached to the end cap 22. A plurality of involute teeth 23a is formed at the other end side of the rotation shaft 23. That is, the rotation shaft 23 is an involute spline shaft, and a hole (spline hole 321) corresponding to the involute teeth 23a is provided at the center of a rotor 32 to be described later.

The end cap 22 is attached to an opening side of the motor cover 21, which fits on the side of the vane pump unit 30, but a center hole 221 into which the rotation shaft 23 is inserted is provided at the center side of the end cap 22 (see FIG. 4). Further, a circumferential flange unit 222 protruding in a circumferential shape is provided at the center side of the end cap 22, and the bearing 24b explained above is fit into the fitting unit 223 encircled by the circumferential flange unit 222.

A rotator 231 is attached to the rotation shaft 23, and a wire is wound around this rotator 231. On the inner wall of the motor cover 21, magnets 25 are provided to face the rotator 231. Further, a commutator 232 is attached to the rotation shaft 23 at the side closer to the vane pump unit 30 than the rotator 231, and the commutator 232 is disposed to be in contact with a brush 26.

The brush 26 for providing electric power to the commutator 232 is supported by a brush support unit 233 supported by the end cap 22. Therefore, even when the commutator 232 rotates with respect to the brush 26 according to the rotation of the rotation shaft 23, the brush 26 does not follow the rotation shaft 23 and provides electric power to the commutator 232. The brush support unit 233 is integrally formed with the end cap 22. In the conventional configuration, the brush 26 is supported by a brush plate separate from the end cap 22, but in the present embodiment, a configuration is employed in which the brush support unit 233 having the function of the brush plate is integrally configured with the end cap 22. In the present embodiment, the end cap 22 integrally formed with the brush support unit 233 is formed by, for example, resin molding.

As shown in FIGS. 1 and 4, the end cap 22 is integrally provided with a power supply bus bar 27. The power supply bus bar 27 is an elongated portion protruding from the end cap 22 toward the vane pump unit 30 side, and the cross section thereof taken in a direction perpendicular to the protruding direction is a flat shape made by connecting a pair of arcs of semicircles and a pair of straight lines. In the power supply bus bar 27, a lead line 28 (corresponding to wiring) is present, and a portion of the lead line 28 protrudes from the front end of the power supply bus bar 27. For example, when the end cap 22 having the power supply bus bar 27 is resin-molded, the lead line 28 is formed in such a manner that it is embedded in the power supply bus bar 27 by methods such as insert molding and the like, for example. Therefore, the lead line 28 electrically connecting the brush 26 and a connection unit 46 can be disposed over the entire long power supply bus bar 27. However, an insertion hole may be provided along the longitudinal direction of the power supply bus bar 27, and the lead line 28 may be inserted into the insertion hole. It should be noted that the connection unit 46 will be explained later.

As shown in FIGS. 1, 2, 4, and 5, the end cap 22 of the motor unit 20 is attached to a pump plate 31, a component of the vane pump unit 30, via an O ring S1. The vane pump unit 30 includes not only the pump plate 31 but also the rotor 32, the vane 33, a seal S2 and the like, and the like, which will be explained later in order. In the present embodiment, the vane pump unit 30 is a portion functioning as a dry-type and vane-type vacuum pump not using any lubricating oil. The vane pump unit 30 corresponds to the pump unit.

Figure 6:
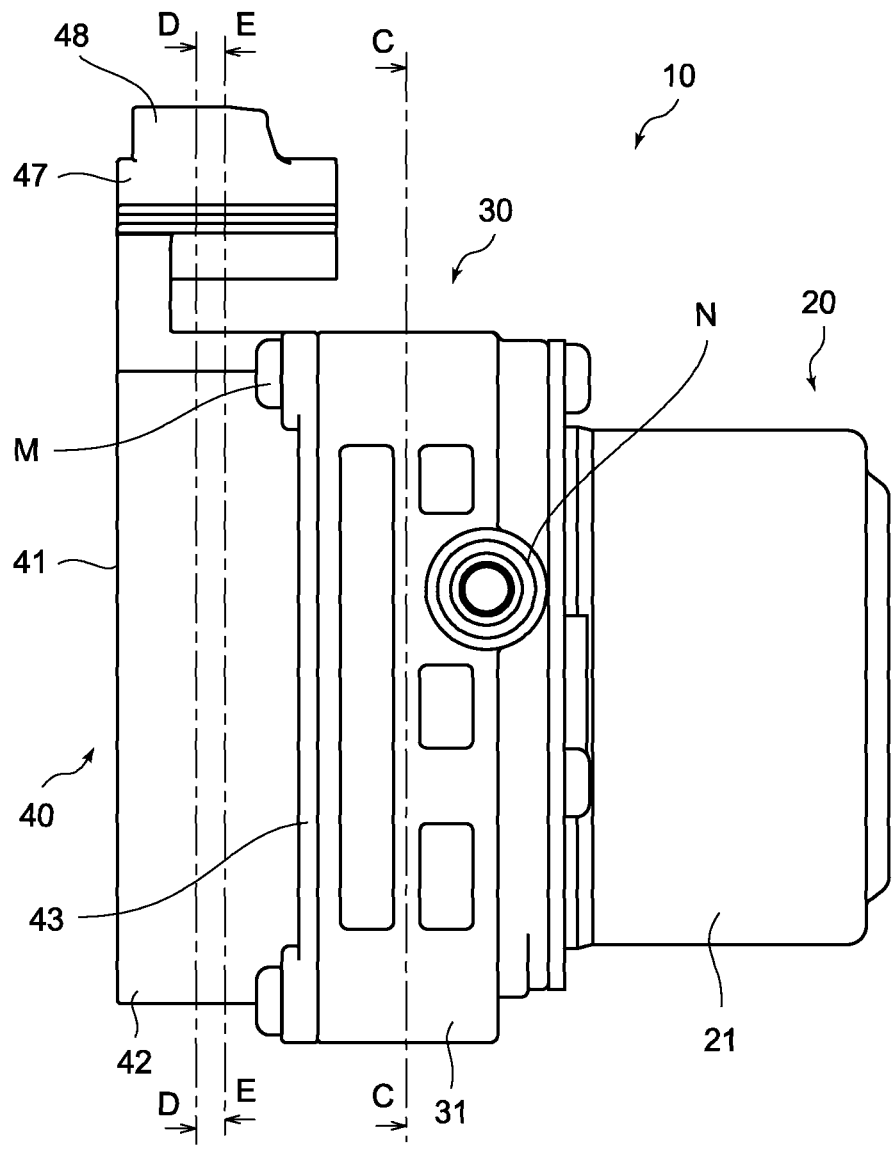
FIG. 6 is a side view of the electric pump of FIG. 1.
Figure 7:
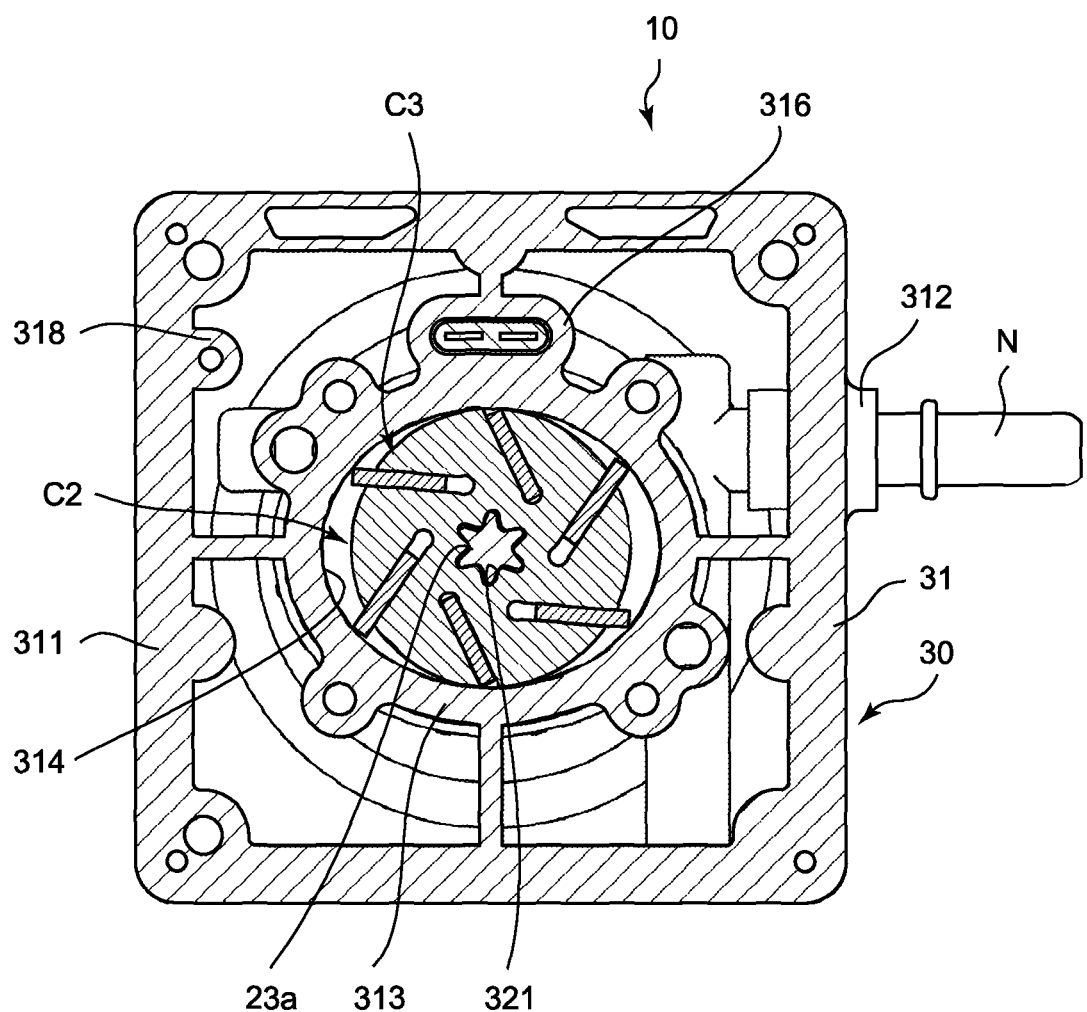
FIG. 7 is a cross sectional view illustrating a configuration of electric pump taken along line C-C of FIG. 6 when it is seen from the front surface side (cover side).
Figure 8:
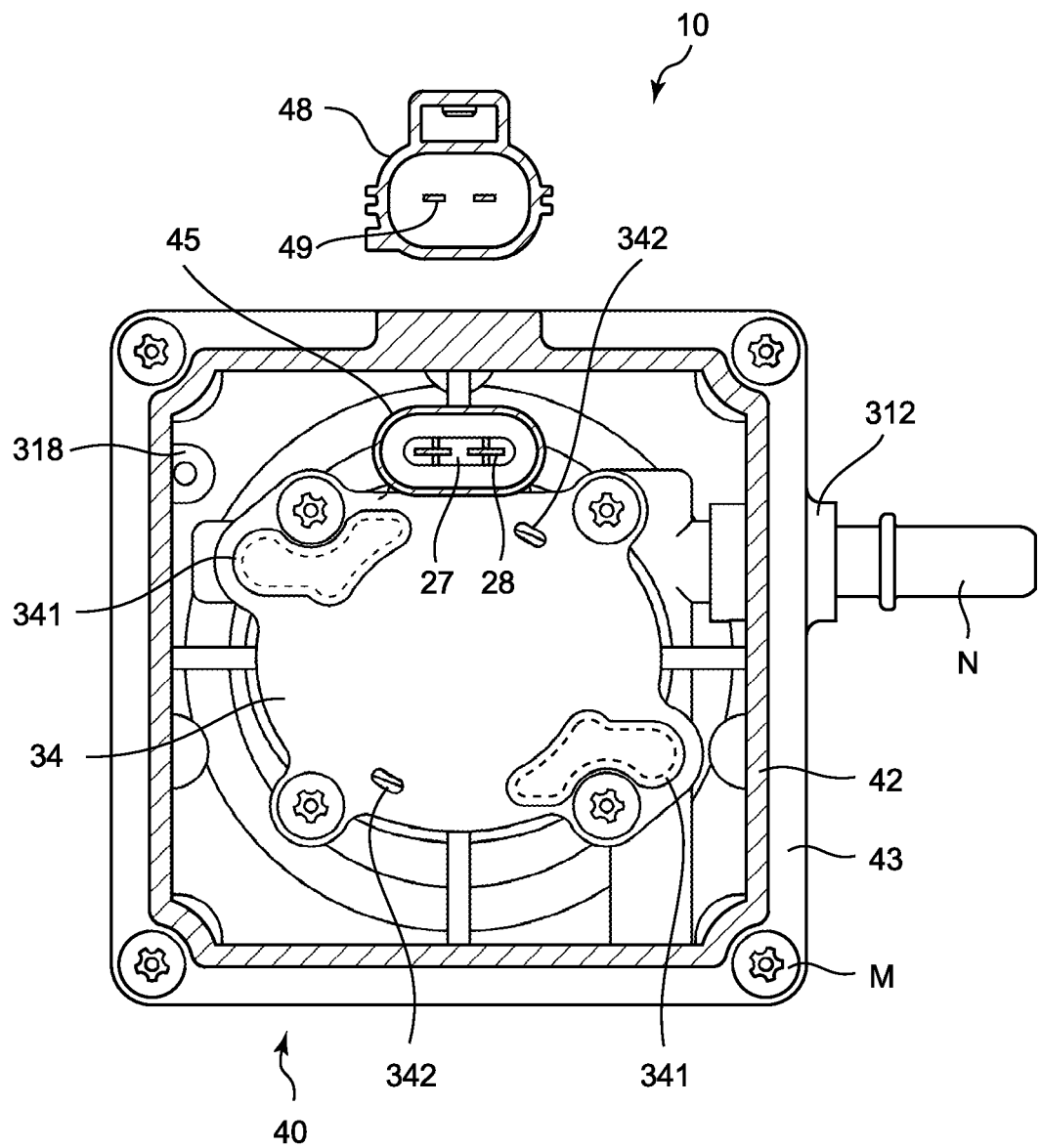
FIG. 8 is a cross sectional view illustrating a configuration of electric pump taken along line D-D of FIG. 6 when it is seen from the front surface side (cover side).

FIG. 6 is a side view of the electric pump 10. FIG. 7 is a cross sectional view illustrating a configuration of the electric pump 10 taken along line C-C of FIG. 6 when it is seen from the front surface side (at the side of the cover 40). FIG. 8 is a cross sectional view illustrating a configuration of the electric pump 10 taken along line D-D of FIG. 6 when it is seen from the front surface side (at the side of the cover 40).

As shown in FIGS. 1 and 8, the pump plate 31 is a cam ring integrated-type plate in which each unit (for example, a cam bottom surface 315 and the like, explained later) including an external wall portion 311 and a cam ring 313 are integrally formed. Moreover, the pump plate 31 is made of, for example, an aluminum-based member which is a material having a high degree of thermal conductivity, but may be made of other materials (for example, a steel-based member). Examples of aluminum-based material that can be used include publicly known aluminum alloys such as Al—Si-based, Al—Si—Cu-based, Al—Fe—Cu-based, and Al—Si—Fe—Cu-based alloys, and an Al—SiC composite material obtained by adding SiC powder to the aluminum or aluminum alloy.

As shown in FIGS. 1 and 7, the entire internal configuration of the pump plate 31 is covered by the external wall portion 311 which has a substantially rectangular external appearance when seen in the top view, but this external wall portion 311 is provided with a nipple connection port unit 312 connected with a nipple N. The nipple connection port unit 312 is in communication with one end side of an intake path P (see FIG. 5) provided in the pump plate 31. The other end side of the intake path P is exposed in an intake chamber C2 explained later, and a gas can be introduced into the intake chamber C2.

At the central side of the pump plate 31, the cam ring 313 enclosed by the external wall portion 311 is provided. The cam ring 313 is a ring-shaped portion projecting from the bottom surface side (the motor unit 20 side) of the pump plate 31 toward the cover 40 side, and the inner ring surface of the cam ring 313 is a cam surface 314. As can be seen in FIG. 1, the cam ring 313 has an outer ring surface opposite the inner ring surface, which outer ring surface is spaced from the external wall portion 311 in a radial direction. A cam bottom surface 315 is provided at the bottom surface side in the inner space enclosed by the cam ring 313, so that the bottom surface side of the rotor 32 can be received. Further, the closing plate 34 (explained later) is attached to the side of the cover 40 of the cam ring 313. A rotor chamber CI which is a space closed by the inner ring surface or cam surface 314, the cam bottom surface 315 (see FIGS. 1, 4 and 5, and the like) and the closing plate 34 is formed.

As shown in FIG. 7, the cam surface 314 is provided in an oval shape, and the length in the minor axis side of the oval shape corresponds to the diameter of the rotor 32 which is a circular shape in the top view. Therefore, when the rotor 32 is arranged in the rotor chamber C1, two crescent shaped spaces (hereinafter referred to as intake chambers C2) with the short axis being the border is formed in the rotor chamber C1. The intake chambers C2 are in communication with the intake path P explained above, so that a gas can be introduced into this intake chamber C2.

Since the electric pump 10 according to the present embodiment is dry-type not using any lubricating oil, the cam surface 314 is formed with a coating film for improving the sliding property. As long as the sliding property can be improved, the composition and the deposition method of the coating film are not particularly limited, but it is preferable to employ a publicly-known hard plating film. Examples of the hard plating film include Ni—P—X (X at least a metal selected from W, Co, Pd, Re, Y, Mo, Ti, Mn, V, Zr, Cr, Cu, Au, Ag, Zn, Fe, Pb, Su, and Pt. The same applies hereinafter.) based plating film and Ni—B—X based plating film exemplified, for example, in JP 2001-192850 A, Co—W based plating film exemplified, for example, in JP 4-94489 A, and Ni—Co—P—W based plating film exemplified, for example, in JP 4185523 B1.

As shown in FIGS. 1 and 7, the pump plate 31 is provided with a bulged portion 316 which is made by causing a portion of the outer ring surface of the cam ring 313 to bulge radially outward, and this bulged portion 316 is provided with a penetration hole 317. The penetration hole 317 is a hole through which the power supply bus bar 27 and wiring is inserted, and is configured to be in a hole shape slightly larger than the power supply bus bar 27. More specifically, even when the power supply bus bar 27 is inserted into the penetration hole 317, there is a slight gap between 13 the power supply bus bar 27 and the inner wall surface of the penetration hole 317. A discharge pipe 318 is integrally formed in proximity to the inner peripheral side of the external wall portion 311 of the pump plate 31. The discharge pipe 318 is a portion for discharging a gas discharged to the inside of the cover 40 from communication holes 342 (explained later). The pump plate 31 is provided with a protruding pipe 319 in communication with the discharge pipe 318 to protrude to the side of the motor unit 20.

The rotor 32 has a generally cylindrical appearance, but has at the center side the spline hole 321 corresponding to the above described involute teeth 23a. Rotational force of the rotation shaft 23 is transferred to the rotor 32 as the involute teeth 23a engage the spline hole 321. The external peripheral surface of the rotor 32 is provided with multiple vane grooves 322, and the vane 33 is movably accommodated in the vane groove 322. The vane groove 322 is provided in parallel to the central axial line L of the rotor 32 (see FIGS. 1, 2, and 4), and the vane groove 322 is not along the diameter direction of the rotor 32, and is formed in a direction such that a direction from the central side to the external peripheral side matches the direction of advancement of rotation. The vane 33 is disposed in the vane groove 322 explained above, and the vane 33 comes into abutment with the cam surface 314 due to the centrifugal force of the rotation of the rotor 32, so that the pressure chamber C3 is formed in the intake chamber C2. The pressure chamber C3 is a portion of the intake chamber C2 which is partitioned by a vane 33 and the rotor 32, or a portion thereof partitioned by adjacent vanes 33.

As shown in FIGS. 1 and 8, the closing plate 34 is attached to the end surface of the cam ring 313 at the side of the cover 40 using screws and the like, for example, and the rotor chamber C1, which is a closed space, is formed by the attachment of the closing plate 34. A projection unit 341 projecting toward the cover 40 by plastic deformation of the closing plate 34 made through press work is formed on the closing plate 34. The projection unit 341 at the side of the motor unit 20 is a portion of the intake path P (see FIG. 5). The projection unit 341 at the side close to the rotation center is an opening portion in communication with the rotor chamber C1. A portion of an insertion hole P1 constituting the intake path P is formed in the cam ring 313 explained above, and the insertion hole P1 is in communication with the projection unit 341 at the side away from the rotation center. The insertion hole P1 is in communication with the nipple N explained above.

The closing plate 34 is provided with the communication holes 342. The communication holes 342 are in communication with the intake chambers C2. The opening portion of the projection unit 341 is in communication with one end side of the intake chamber C2 in a crescent shape as shown in FIG. 7, and the communication hole 342 is in communication with the other end side of the intake chamber C2 in the crescent shape. When seen in the rotation direction of the rotor 32, the external peripheral surface of the rotor 32 passes in proximity to the opening portion of the projection unit 341, and advances along the intake chamber C2 for some distance, and thereafter, comes to the vicinity of the communication hole 342.

As shown in FIGS. 1 and 2, the cover 40 is attached to the pump plate 31 with a seal S2 interposed therebetween. The cover 40 is a member for covering and closing the pump plate 31 opposite side to the motor unit 20. This cover 40 is provided with a top surface portion 41 and a side surface portion 42, and the top surface portion 41 faces the pump plate 31 with a predetermined gap therebetween. A flange unit 43 is provided on the side surface portion 42 at the side of the vane pump unit 30, and the flange unit 43 is in contact with the end surface of the external wall portion 311, and is fixed to the external wall portion 311 with screws M. As shown in FIG. 5, multiple ribs 44 are provided to protrude from the top surface portion 41 toward the pump plate 31 side, and these ribs 44 are disposed along the vertical direction and the horizontal direction perpendicular to the central axial line L.

Figure 9:
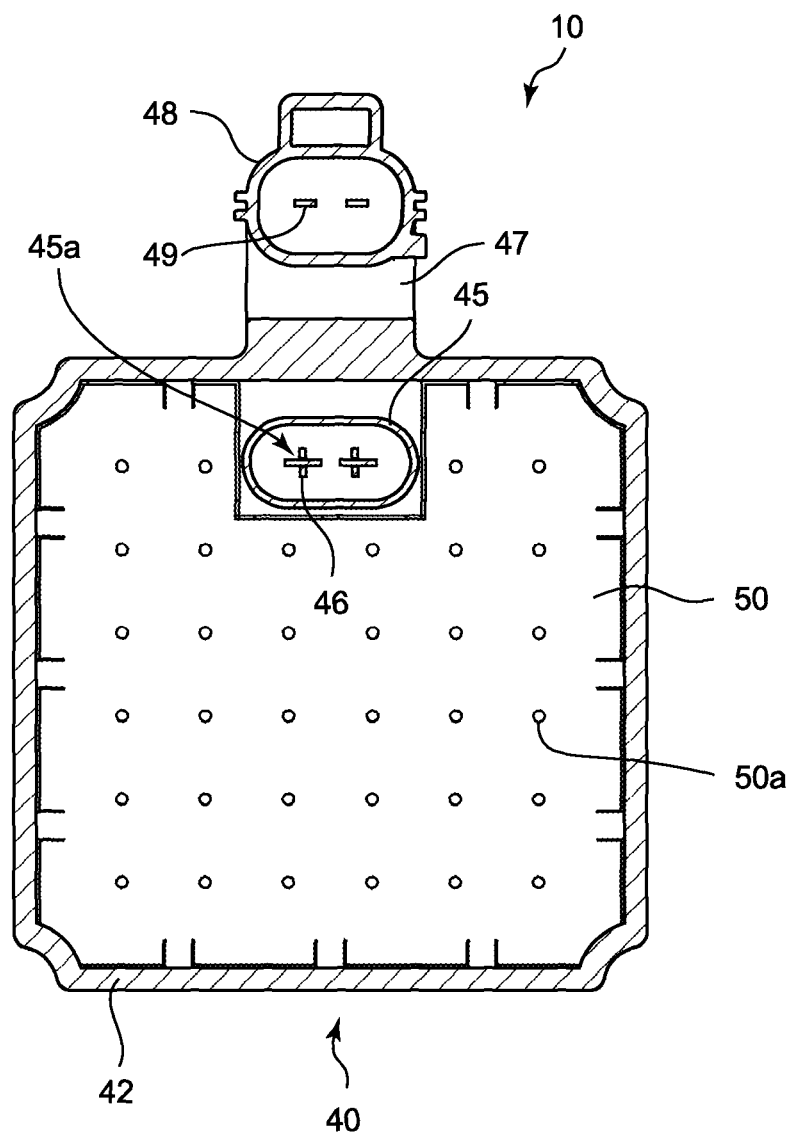
FIG. 9 is a cross sectional view illustrating a configuration of electric pump taken along line E-E of FIG. 6 when it is seen from the front surface side (cover side).

FIG. 9 is a cross sectional view illustrating a configuration of the electric pump 10 taken along line E-E of FIG. 6 when it is seen from the back surface side (the side of the motor unit 20). The end surface of the ribs 44 at the side of the vane pump unit 30 is a receiving surface for the resonator plate 50 as shown in FIGS. 2 and 9, and the resonator plate 50 is arranged on the receiving surface. Accordingly, small chambers C4 (see FIG. 5) enclosed by the top surface portion 41, the rib 44, and the resonator plate 50 are formed. As shown in FIG. 9, the resonator plate 50 is formed with multiple holes 50a respectively in communication with the small chambers C4. The gas can enter there and exit therefrom through the hole 50a, and the small chamber C4 functions as a resonator using sound resonance effect.

As shown in FIGS. 2, 4, 8, and 9, a connector box 45 having a raised structure is provided on the cover 40 in a protruding manner from the top surface portion 41 thereof toward the pump plate 31 side, the connector box aligned with the penetration hole 317, and an insertion recessed portion 45a in a recessed shape is formed by being enclosed by the connector box 45. The power supply bus bar 27 explained above can be inserted into the insertion recessed portion 45a (see FIG. 4). The connection unit 46 electrically connected to the lead line 28 is provided in the insertion recessed portion 45a at the side of the top surface portion 41, and when the power supply bus bar 27 is inserted into the insertion recessed portion 45a, the lead line 28 is electrically connected to the connection unit 46.

The insertion recessed portion 45a is provided in such a manner as to be positioned with the penetration hole 317 existing in the bulged portion 316. A grommet 51 shown in FIGS. 1, 2, and 4 is disposed at the side of the opening of the connector box 45, and this grommet 51 is also in contact with the end surface of the bulged portion 316. As shown in FIG. 4, the grommet 51 gets into the insertion recessed portion 45a by a predetermined amount, and the power supply bus bar 27 is inserted into the insertion recessed portion 45a via the grommet 51, and the lead line 28 is electrically connected to the connection unit 46 when inserted.

As shown in FIGS. 3, 4, 6, 9, and the like, the side surface portion 42 located in proximity to the connector box 45 is provided with an extension unit 47 extending in a direction away from the central axial line L, and a connector cover 48 extends from the extension unit 47 to return back to the motor unit 20 side in parallel with the central axial line L.

It should be noted that the connector cover 48 is made in a cylindrical shape of which end portion at the side of the motor unit 20 is open, and a cable, not shown, can be inserted into this connector cover 48. The connector cover 48 can be formed in various shapes according to the connector shape of the vehicle to which the electric pump 10 according to the present embodiment is attached.

Inside of the extension unit 47, a connector bus bar 49 one end side of which is electrically connected to the connection unit 46 is provided (see FIG. 4), the other end side of the connector bus bar 49 protrudes into the inside of the space of the connector cover 48, so that the connector bus bar 49 can be electrically connected to the inserted cable. The connector bus bar 49 corresponds to a conductive member.

<2. Operation of Electric Pump 10>

In the electric pump 10 having the above configuration, electric power is provided from the cable via the connector bus bar 49, the connection unit 46, the lead line 28, the brush 26, and the commutator 232 to the wound wire of the rotator 231, and by providing the electric power, the rotator 231 and the rotation shaft 23 are rotated.

Then, the rotation of the rotation shaft 23 rotates the rotor 32 counter-clockwise in FIG. 7, and the rotation of the rotor 32 in turn applies centrifugal force on the vane 33 to cause the vane to fly out of the vane groove 322. Thus, the vane 33 contacts the cam surface 314, and when the vane 33 reaches the intake chamber C2, the pressure chamber C3 is formed between the vane 33 and a closest portion (the one closest portion) between the rotor 32 and the cam surface 314, or between adjacent vanes 33. Because the pressure chamber C3 increases its volume for a while as the vane 33 moves along the rotational direction of the rotor 32, a gas such as air is sucked through the opening portion of the projection unit 341. However, as the vane 33 moves for a while toward a closest portion (the other closest portion) between the rotor 32 and the cam surface 314, the pressure chamber C3 in turn decreases its volume, so that the gas inside is compressed. Accordingly, when the pressure chamber C3 communicates with the communication hole 342, a gas such as air is discharged through the communication hole 342.

When a gas enters into the cover 40 through the communication hole 342, pressure fluctuations (sound wave) of the gas enters through the holes 50a. Then, at a particular frequency of the sound wave, air inside the small chambers C4 resonates, and the resonance strongly vibrates air flowing in and out of the holes 50a. This increases friction loss to give sound absorbing effect. Then, the gas discharged through the communication hole 342 is discharged through the discharge pipe 318 to the outside.

<3. Effect>

According to the electric pump 10 with the above configuration, the end cap 22 is integrally provided with the power supply bus bar 27, which passes through the penetration hole 317 of the pump plate 31 and then is inserted into the insertion recessed portion 45a of the connector box 45. The lead line 28 protruding from the front end of the power supply bus bar 27 is electrically connected to the connection unit 46 in the insertion recessed portion 45a.

Accordingly, the lead line 28 is electrically connected to the connection unit 46 which is provided at the cover 40 side. As a result, the electric pump 10 can meet various attachment modes and various requirements by changing designs of the cover 40 without having to change designs of the motor unit 20. That is, when a connecting portion to a connector is provided at the motor unit 20 side corresponding to various shapes of connectors, for example, in a vehicle and the like, where connectors with various shapes are used, even similar types of motor units 20 require forming different molds for molding according to the connecting portion to the connector, and also, molding the motor units 20 requires high accuracy in view of the relation with the axis of the rotation shaft 23, thereby increasing the costs accordingly.

When adopting a configuration in which the power supply bus bar 27 protrudes from the end cap 22 and the lead line 28 protruding from the protruding end of the bus bar connects to the connection unit 46 of the cover 40, as described above however, a portion corresponding to the connecting portion to the connector may be provided at the cover 40. In the present embodiment, the connector cover 48 corresponds to such a portion. Then, shaping the connector cover 48 to correspond to various connectors can achieve commonality of motor units 20 which might even be electrically connected to various types of connectors.

Moreover, in the present embodiment, various electrical configurations including the connector bus bar 49 can be provided at the cover 40 which can secure sufficient space for electrical configuration. Accordingly, the electric pump 10 of the embodiment can easily correspond to changes in electrical configuration. As a specific example, an electric pump 10A with electrical configurations different from those of the electric pump 10 described in FIGS. 1 to 9 will be described with reference to FIG. 10.

Figure 10:
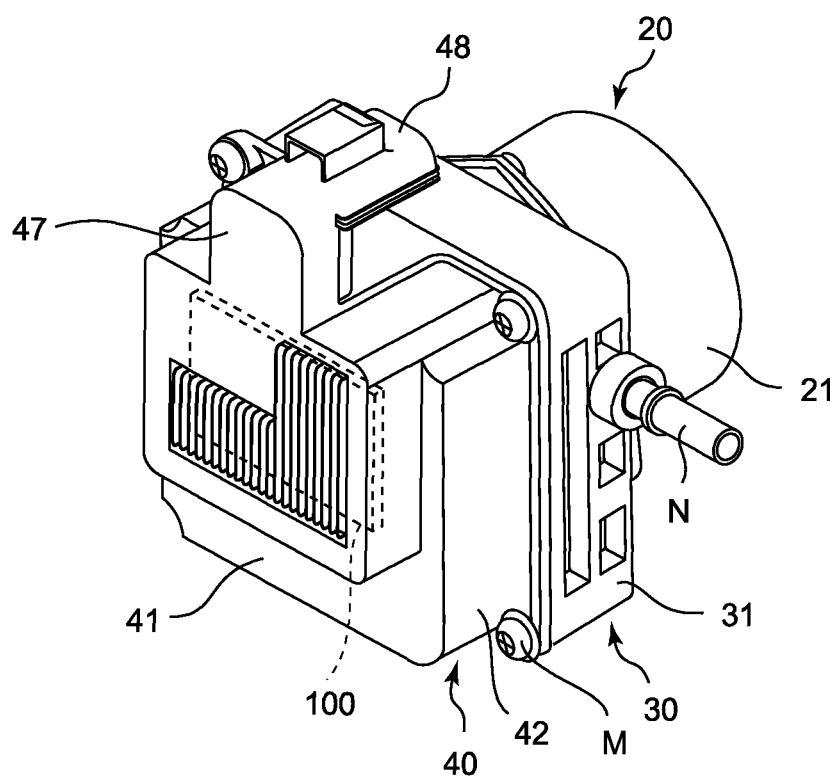
FIG. 10 is a perspective view showing a configuration of an electric pump according to a modification of the present invention.

FIG. 10 is a perspective view of the electric pump 10A having a configuration in which a controller board 100 is provided at a cover 40. When providing the controller board 100 incorporating a micro computer and the like for controlling action of the rotation shaft 23 in the motor unit 20, a portion for mounting the controller board 100 is required to have a relatively large area. Accordingly, it is difficult to mount a controller board onto a conventional electric pump. As a result, the controller board is often mounted separately from the electric pump.

In contrast, in the present embodiment, because various electrical configurations including a connector bus bar 49 can be provided at the cover 40 side which can secure sufficient space for electrical configuration, it is needless to say that the controller board 100 as shown in FIG. 10 can be provided at the cover 40 side. Therefore, it is possible to achieve an electric pump 10A integrally incorporating the controller board 100, which is difficult to achieve with conventional techniques.

In the case of the electric pump 10A as shown in FIG. 10, the controller board 100 is provided at the top surface portion 41 of the cover 40 side. The top surface portion 41 is placed away from a vane pump unit 30 generating heat in a compression process, and further, the controller board 100 is provided at the top surface portion 41 side through small chambers C4 functioning as a resonator on the side away from the vane pump unit 30. Therefore, the present embodiment can suppress the influence of the heat generated in the vane pump unit 30 on the controller board 100.

Moreover, in the present embodiment, the pump plate 31 has the bulged portion 316 formed by bulging the part of the cam ring 313 toward the external diameter side, and the penetration hole 317 is provided in the bulged portion 316. Adoption of the configuration in which the power supply bus bar 27 is inserted through the penetration hole 317 of the bulged portion 316 as above improves guiding performance of the power supply bus bar 27, thereby preventing the power supply bus bar 27 from bending and so on until it is guided to a connection unit 46. Also, presence of a little space between the power supply bus bar 27 and the inner wall surface of the penetration hole 317 allows heat generated in the compression process in a rotor chamber C1 to be released to the outside of the vane pump unit 30 through the space in the penetration hole 317. Further, the provision of the bulged portion 316 increases the surface area of the cam ring 313, thereby also achieving the effect of releasing heat generated in the rotor chamber C1.

Further, in the present embodiment, the cover 40 is provided with the extension unit 47 and the connector cover 48. The external cable is inserted into the inner space of the connector cover 48. The connector bus bar 49 one end side of which is electrically connected to the connection unit 46 and the other end side of which protrudes into the inner space of the connector cover 48 is provided inside the extension unit 47. Therefore, the motor unit 20 is favorably provided with electric power simply by inserting an external cable into the connector cover 48.

<Modification>

The embodiments of the present invention have been described hereinbefore. The invention however can be carried out with various modifications in addition to them. The modifications will be described hereinafter.

Although the electric pump 10 is of dry type not using a lubricating oil in the above embodiment, a wet type electric pump using a lubricating oil may be applied to the invention. Also, although in the embodiment the pump unit is the vane pump unit using a vane-type pump, the invention may be applied to a pump unit using pumps other than a vane-type pump.

The above embodiment adopts the configuration in which the cover 40 is provided with the extension unit 47 protruding outwardly from the side surface portion 42, and the connector cover 48 is connected to the extension unit 47. However, the extension unit 47 may be removed and a portion corresponding to the connector cover 48 may extend from the side surface portion 42 toward the inside side of the cover 40.

The above embodiment adopts the configuration in which one extension unit 47 extends outwardly from the side surface portion 42 of the cover 40 and one connector cover 48 is connected to the extension unit 47. However, the numbers of the extension unit 47 and the connector cover 48 are not limited to only one, and two or more extension units 47 and two or more connector covers 48 may be provided. For example, a plurality of connector covers 48 corresponding to different types of cables and the same number of or less extension units 47 may be provided.

REFERENCE SIGNS LIST 10, 10A . . . Electric pump
20 . . . Motor unit
21 . . . Motor cover
22 . . . End cap
23 . . . Rotation shaft
23a . . . Involute tooth
26 . . . Brush
27 . . . Power supply bus bar
28 . . . Lead line (corresponding to wiring)
30 . . . Vane pump unit (corresponding to pump unit)
31 . . . Pump plate
32 . . . Rotor
33 . . . Vane
34 . . . Closing plate
40 . . . Cover
41 . . . Top surface portion
42 . . . Side surface portion
44 . . . Rib
45 . . . Connector box
45a . . . Insertion recessed portion
46 . . . Connection unit
47 . . . Extension unit
48 . . . Connector cover
49 . . . Connector bus bar
50 . . . Resonator plate
51 . . . Grommet
100 . . . Controller board
231 . . . Rotator
232 . . . Commutator
311 . . . External wall portion
313 . . . Cam ring
314 . . . Cam surface
316 . . . Bulged portion
317 . . . Penetration hole 322 . . . Vane groove
341 . . . Projection unit
342 . . . Communication hole
C1 . . . Rotor chamber
C2 . . . Intake chamber
C3 . . . Pressure chamber
C4 . . . Small chamber

The invention claimed is:

1. An electric pump, comprising: a motor unit including a rotation shaft, an end cap attached to an opening portion side of a motor cover, a power supply bus bar integral with the end cap and extending toward a side away from a bottom of the motor cover, and wiring situated in the power supply bus bar and protruding from a front end of the power supply bus bar;

a pump unit connected to the motor unit, the pump unit including a rotor having a vane groove for receiving a vane and connecting to the rotation shaft, and also including a pump plate integrally provided with an external wall portion surrounding a cam ring, the cam ring having an external ring surface and an internal ring surface on which the vane slides, the external ring surface spaced from the external wall portion in a radial direction, the cam ring having a bulged portion provided by bulging the external ring surface of the cam ring radially outward, the bulged portion provided with a penetration hole through which the power supply bus bar and wiring can be inserted; and a pump cover covering the pump unit from a side opposite to the motor unit, the pump cover provided with a connector box having a raised structure which extends towards the pump unit and aligns with the penetration hole, the raised structure surrounding an insertion recessed portion into which the power supply bus bar and wiring is inserted, the wiring being electrically connected to a connection unit provided in the insertion recessed portion;

wherein the pump cover includes a connection cover, an external cable is inserted into an inner space of the connection cover, and a conductive member having one end side electrically and directly connected to the connection unit and the other end side protruding into the inner space of the connector cover is provided to an inside of the pump cover.

2. The electric pump according to claim 1, wherein an extension unit extends outwardly from an external wall portion of the pump cover, the connector cover is drawn from the extension unit, and the conductive member is provided to an inside of the extension unit.

* * * * *